May 10, 1960   J. HOCK ET AL   2,935,999
DELAY ACTION PRESSURE BY-PASS SYSTEMS AND VALVES
THEREFOR FOR HYDRAULIC TRANSMISSIONS
Filed Dec. 1, 1955   2 Sheets-Sheet 1

Inventors
JOSEF HOCK,
FRIEDRICH SCHUEPPEL,
FERDINAND BAUMANN,
BY Perry & Joy
ATTORNEYS

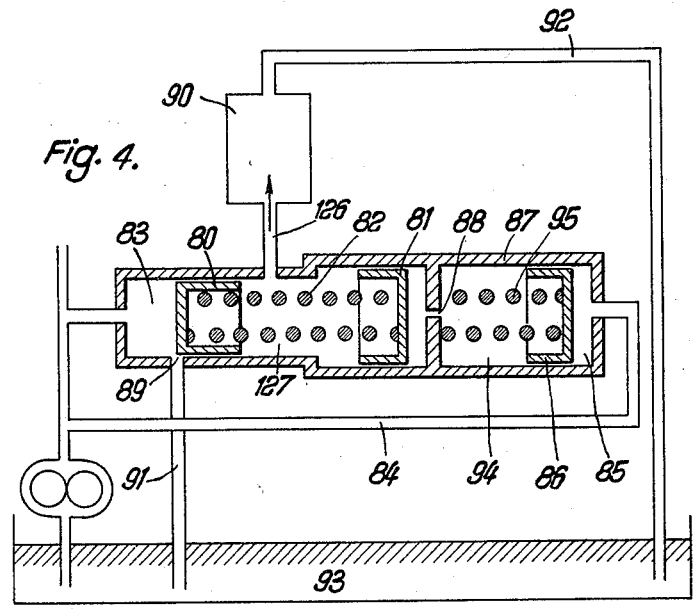
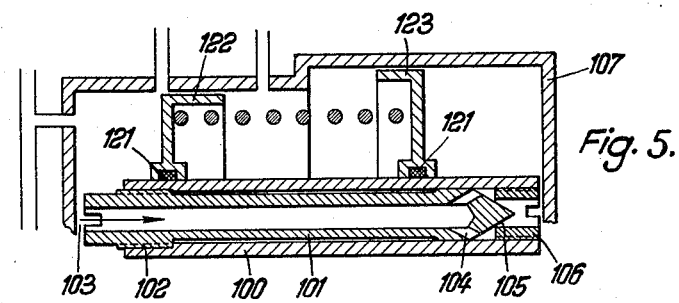
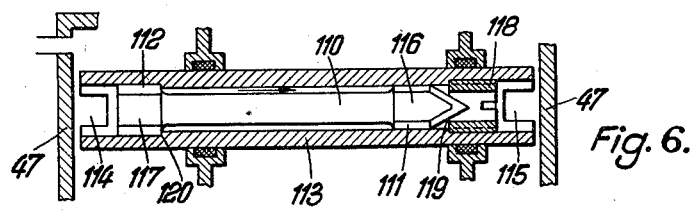

United States Patent Office 2,935,999
Patented May 10, 1960

2,935,999

DELAY ACTION PRESSURE BY-PASS SYSTEMS AND VALVES THEREFOR FOR HYDRAULIC TRANSMISSIONS

Josef Hock, Friedrichshafen-Manzell, and Friedrich F. Schüppel and Ferdinand A. J. Baumann, Friedrichshafen, Germany, assignors to Zahnradfabrik Friedrichshafen, Friedrichshafen, Germany Application December 1, 1955, Serial No. 550,445

Claims priority, application Germany December 3, 1954

10 Claims. (Cl. 137—468)

This invention relates to pressure control systems especially for hydramatic transmissions, in which a gradual increase in operating pressure is desired.

It has heretofore been customary to install a flow control nozzle in the pressure pipe line of hydramatic transmissions; such nozzles have a sharp edge on the upstream side and are rounded on the downstream side. This effects a delay in reaching the full coupling-pressure. The arrangement, however, has the disadvantage that the cross-section of the pressure line leading the the coupling is narrowed down at the nozzle whereby disengagement of the coupling is also delayed.

Accordingly it is an object of the present invention to overcome this disadvantage and to provide a simple, inexpensive and rugged mechanism for achieving such purpose. Other objects and features of the invention will be apparent from the description to follow.

The present invention contemplates a hydraulically controlled high pressure by-pass or relief valve assembly having a valve piston and a control piston, the latter exerting force through springs against the valve piston to control its motion. The pressure chamber of the relief valve is connected with the pressure line and a discharge line. The spring resistance and the diameters of the valve piston and the control piston are of such proportions as to effect the desired delay of pressure fluid to the coupling by initially by-passing the fluid to the supply tank. Since the control piston is operated by fluid pressure through a flow delay device, the rate of motion is controlled, thus controlling the valve piston.

In most forms of the invention, a one-way throttling device is installed in the connecting line between the control piston and the pressure line. This results in a delayed action of the control piston and thereby a gradual increase of the coupling pressure only when the valve is operated. When pressure on the valve is relieved the delaying effect of the throttling device is neutralized, so that the valve can return quickly to its starting position. Thus, the valve is useful in cases where he changing of gears of several couplings in quick succession is needed. Further details of the invention will be understood from the following description in conjunction with the appended drawing in which:

Fig. 4 shows a relief valve with an auxiliary chamber;

Fig. 5 shows a cross section of an adjustable, thermostatic throttling device;

Fig. 6 shows a one-way throttle with compensating structure.

Figure 1:
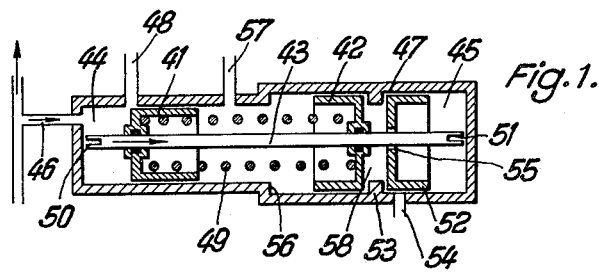
Fig. 1 shows a relief valve with a centrally placed feed line to the control piston.

Fig. 1 shows a valve with a central line 43, between a chamber 44 of the valve piston 41 and the chamber 45 of the control piston 42. The oil flows in the direction of the arrow through line 46 into the chamber 44 of the valve housing 47. Thereby the spring-loaded piston 41 is pressed out of rest position at the left end of the housing 47 until it reaches approximately the position shown; as a result the discharge channel 48 has been partially opened. An oil pressure is built up corresponding to the pressure of the spring 49; this pressure passes through the line 43 via openings 50 and 51 into chamber 45. In consequence of this pressure a slide valve 52, equipped with a ring-shaped throttling aperture 55 is pressed against a stop shoulder 53, and, in this position, closes a bleed orifice 54. The oil enters through the throttling aperture 55 between the slide valve 52 and the pipe 43 into the chamber 58 to the face of the control piston 42, and presses the latter in a delayed movement as far as the stop shoulder 56. Simultaneously the highest coupling pressure $p_2$ is building up on the face of valve piston 41. An opening 57 serves for bleeding of the chamber and for drawing off the leak-oil between the pistons 41 and 42.

After the coupling has been disengaged, the oil which has been displaced by the retreating piston 42 moves the slide valve to the right and thereby the opening 54 is exposed so that oil can flow back freely into the oil-sump, by-passing the throttling aperture 55. The pistons 41 and 42 return immediately to their rest positions. Therefore, there is no delay in shifting and this valve can be used for the shifting of several couplings in quick succession in conjunction with a distributor arrangement.

Figure 2:
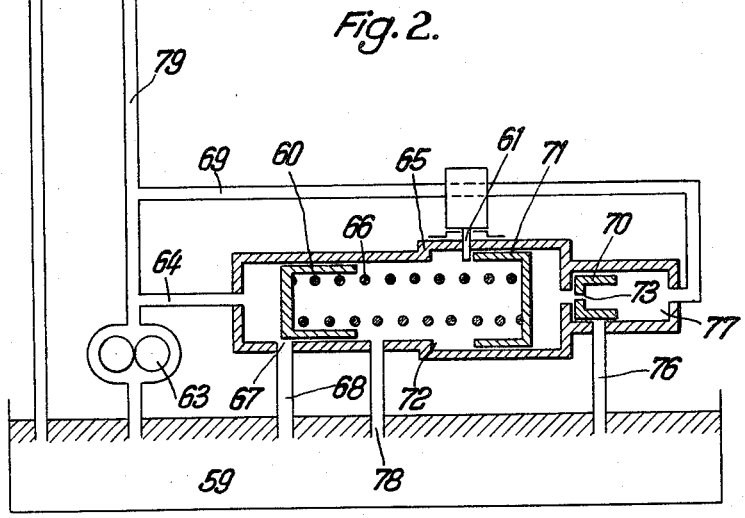
Fig. 2 shows a system of control for several couplings with an oil pressure valve having quick relief action.

Fig. 2 shows a system for a relief valve with quick relief for shifting a plurality of couplings, e.g., four couplings. The gear pump 63 sucks the oil from the oil sump 59. The pressure oil flows through line 64 to the face of the valve piston 60. The valve piston 60 is thus shifted to compress spring 66 until the discharge port 67 is opened and oil can flow back to the oil sump 59 through line 68. The valve piston 60 is shifted until the pressure exerted by spring 66 and the oil pressure in line 64 are balanced. A line 78 draws off the leak oil from the chamber between pistons 60 and 71, the control piston, and carries it back to the sump.

Figure 3:
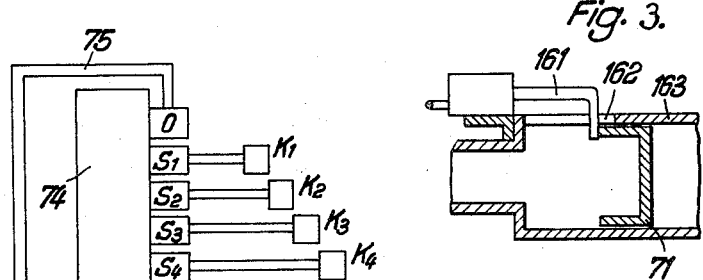
Fig. 3 shows a partial section of an adjustable stop which may be used in the system of Fig. 5 to predetermine the timing of the system.

Simultaneously with fluid loading of valve piston 60, pressure oil flows through the connecting line 69 to a chamber 77 in which a slide valve 70 has been installed. The latter contains a throttling orifice 73. The movable slide valve 70 is pressed to the left against a stop shoulder in the housing 65, and the pressure oil flows gradually through the throttling orifice 73 against the face of the control piston 71, which latter is pressed to the left until it meets a stop element or pin 61. Thus, the discharge port 67 is narrowed down and the oil pressure increases. Pin 61 may be solenoid controlled to be withdrawn from the path of piston 71 or to limit the travel of the piston, so that the pressure valve in the pressure line can be adjusted at will to either of two pressures. The pin can be operated simultaneously with one of the valves S1 to S4. If the the pin is pushed forward, the piston 71 stops in the intermediate position as shown in the drawing. The pressure which builds up in the pressure line 79 is an intermediate value governed by the pressure of the spring 66 for the pertinent position of the piston 71. The value can be determined through adjustable positioning of pin 61 as shown in Fig. 3. Thus the device can be used for the delayed operation of two couplings of one vehicle transmission under different pressures. Through stops 72 or 61, Fig. 2, the thrust of the control piston, and with it, the pressure in the pressure line is limited to one or to two pressures. However, a pin 161 (Fig. 3) movable in the direction of the thrust could also be utilized so as to be disposable at any desired point in the path of piston 71 to effect any choice of pressure in line 79. Through the delaying effect of the small opening 73 in the slide valve 70, the movement of the control piston 71 is delayed so that a certain time elapses until the discharge channel is narrowed down to its smallest value and the greatest pressure has been built up in the pressure line. The operating pressure in the couplings $K_1$ to $K_4$ rises with corresponding slowness; these couplings can be connected according to choice with the pressure line 79, by means of valves S1 to S4, located in control block 74. When a valve S1–S4 is operated, the pressure line is first connected with a bleed line 75 via a bleed valve 0, whence the relief valve 60 is relieved. The pistons 60 and 71 are instantaneously pressed back into their starting position by spring 66. The quick return of the control piston 71 is possible because the slide valve 70 is pressed to the right by the returning oil and thus opens up the bleed line 76.

Fig. 4 shows a relief valve with an ante-chamber. The relief valve consists of a valve piston 80 and the control piston 81. The two pistons have different diameters and are biased against each other through spring 82. The chamber 83 at the face of piston 80 is connected through line 84 with chamber 85 which is sealed oiltight by auxiliary piston 86. Through auxiliary piston 85 and control piston 81 and ante-chamber 94 is formed, which has a throttle orifice 88 and which is closed against the remainder of the oil flow system. It is possible to prevent impurities from getting into the throttle-orifice, because the oil that is locked in the ante-chamber 94 cannot mix with the transmission oil. The available thrust of the auxiliary piston 86 must be greater than the thrust of the control piston 81.

In order to avoid the spraying of the oil, the discharge line 89 is connected by means of a line 91 directly with the oil sump 93; the valve may also be surrounded by a housing which is connected with the oil sump by a single line.

In order to avoid the diminshing of the effective thrust of the piston 86 through escaping of oil from the ante-chamber 94, the chamber 127 between the pistons 80 and 81 is filled with oil and is connected with the displacement chamber 90 by means of a line 126. The chamber 90 is connected with the oil sump 93 by means of a bleed line 92.

When the valve is in working position, it is possible that some oil may be pressed out of the ante-chamber 94, past the piston 81, into the chamber between pistons 80 and 81. This leak oil, however, is moved back into chamber 94 when the pistons 81 and 86 return to rest position because piston 86 is loaded with a spring 95 and effects suction.

Fig. 5 shows a throttling arrangement with an adjustable throttling port 105. The throttling arrangement has been constructed as a centrally located connecting line in the manner of line 43 of Fig. 1.

The method of operation of this valve is similar to that of the valve shown in Fig. 1 except for the operation of the throttling arrangement. The hollow valve stem 101 is screwed by means of a thread 102 into the housing 100. When the valve is under pressure, the oil flows through the hollow stem 101, through the openings 104, to the throttling port 105, and then into the chamber of the control piston 123. Through a threaded sleeve 106, the throttling port 105 can be set to a certain dimension and, as a result, a predetermined rate of flow of the oil can be achieved. Thereby the operating time is fixed at which the greatest coupling pressure is reached. This adjustable throttling arrangement can also be constructed in such a way that the quantity flow rate of the oil remains almost unchanged, even though the viscosity of the oil changes because of changes in temperature. To achieve this end, the valve housing 100 is made of a material with a smaller coefficient of heat expansion than the valve stem 101; the housing for example is made of steel, the valve stem of brass. At an increasing temperature and consequently diminishing viscosity of the oil, the valve stem 101 expands more than the housing 100; that is to say the throttling port 105 is narrowed down. As a result flow rate of the oil with a diminished viscosity hardly changes. In order to achieve a greater difference in heat expansion, the housing 100 can be made of "Invar steel" or a similar iron-nickel alloy.

Fig. 6 shows a further form of a thermostatic throttle which operates only in one direction of the flow; in the other direction it allows the oil to pass through freely. The throttle consists of a valve stem 110 with the valve cone 111 and the guide cylinder 112. The valve stem runs in the duct 113. The duct 113 is mounted in the pistons 122 and 123, which are equipped with packings 121; these pistons correspond to the valve piston 41 or the control piston 42, respectively, as shown in Fig. 4. On the end of duct 113 there are openings 114 and 115. Both the cone 111 and the cylinder 112 are provided with flats 116 and 117; as a result hollow spaces are formed through which the oil flows. The throttling aperture 119 is adjusted through a threaded sleeve 118. In order to make this throttle valve thermostatically responsive, the valve stem 110 has been made of a material with a greater coefficient of heat expansion than the duct 113. The thermostatic effect can also be effected or increased, as the case may be, by using a guide plate made of "Bimetal," instead of the guide cylinder 112; the guide plate is screwed or riveted on to the valve stem 110 in such a manner that it will have the same working results as the thermostatic arrangement described above, which uses different materials for the valve stem and the valve housing.

When the valve is under pressure, the oil flows in the direction of the arrow through the throttle valve, and in doing so, presses the valve stem 110 against the shoulder 120 of the duct 113. The aperture 119 between cone 111 and threaded sleeve 118 is thus narrowed down and functions as a throttle. When pressure on the valve is reduced, the oil flows through the throttle valve in the direction opposite the arrow. This causes the valve stem to move to the left until it fits flush against the housing wall 47. The aperture is thus enlarged and the throttling effect is neutralized. The oil, therefore, can flow through it with undiminished speed and the valve is immediately relieved.

The invention is for hydraulically controlled by-pass or relief valves having a valve piston and a control piston biased against the valve piston with a spring, and having a pressure chamber connected with a pressure line. The spring force and the diameters of the valve piston and the control piston are so proportioned that after a balance between the spring force and the oil pressure against the valve piston has been established, a force resulting from spring action and oil pressure acts upon the control piston. In a line connecting the control piston with the pressures line, a flow delay device is inserted, which regulates the movement of the control piston.

Having thus described our invention, we are aware that various changes may be made without departing from the spirit thereof and, accordingly, we do not seek to be limited to the precise illustration herein given except as set forth in the following claims.

We claim:

1. A delay action by-pass valve system for hydraulic transmissions, comprising a pressure line, a by-pass valve means communicating with said pressure line, a discharge line communicating with said valve means, said valve means being actuatable by pressure fluid from said pressure line to by-pass fluid from said pressure line to said discharge line so as to reduce the pressure to a predetermined value in said pressure line, and means for actuating said valve means to block passage of fluid from said pressure line to said discharge line during the course of a predetermined interval of time; whereby fluid pressure is transmitted at a selectively increasing degree from a minimum to a maximum value; said valve means comprising a valve piston and a control piston, including a spring element intermediate said pistons, a respective chamber for each piston and in which said pistons are movable, said pressure line communicating with the chamber of said valve piston at all times, said discharge line communicating with said valve piston chamber and disposed to be cut off from said chamber by movement of said valve piston, means communicating pressure oil from said pressure line to the chamber of said control piston through a restricting flow throttle, means whereby said control piston can overpower said valve piston to shut off fluid flow from the valve piston chamber through said discharge line within a predetermined time effected by flow through said throttle, wherein said means communicating pressure oil from said pressure line to the chamber of said control piston comprises a tube passing concentrically through said pistons.

2. In a device as set forth in claim 1, said throttle being effected by an additional valve piston surrounding said tube and having a central port spaced therefrom to effect a flow-restricting annular orifice, a chamber surrounding said additional piston having a bleed port, wherein said additional valve piston may move to cover or uncover said bleed port to bleed said chamber, and being moved to block said port by pressure flow through said tube from said valve piston chamber and being reversely moved to uncover said port upon said latter valve being actuated in the reverse direction by movement of said control piston subsequent to release of pressure in said pressure line by fluid trapped intermediate said control piston and said additional valve piston.

3. A delay action by-pass valve system for hydraulic transmissions, comprising a pressure line, a by-pass valve means communicating with said pressure line, a discharge line communicating with said valve means, said valve means being actuatable by pressure fluid from said pressure line to by-pass fluid from said pressure line to said discharge line so as to reduce the pressure to a predetermined value in said pressure line, and means for actuating said valve means to block passage of fluid from said pressure line to said discharge line during the course of a predetermined interval of time; whereby fluid pressure is transmitted at a selectively increasing degree from a minimum to a maximum value; said valve means comprising a valve piston and a control piston and a spring intermediate said pistons whereby force exerted on said control pistons may be transmitted through said spring to move said valve piston, a chamber for each of said pistons, said pressure line being connected to said valve piston chamber and said discharge line being connected to said valve piston chamber whereby movement of said valve piston may serve to block flow of pressure fluid from said pressure line to said discharge line and means for communicating said control piston chamber with said pressure line for effecting movement of said control piston, said means including a restricted flow orifice so as to delay motion of said control piston for a pre-determined degree of time, said restricting flow orifice comprising elements of differing heat coefficients, to reduce or enlarge the flow rate through said orifice in accordance with the temperature of the pressure fluid in said pressure line so as to maintain a substantially uniform rate of flow.

4. A delay action by-pass valve system for hydraulic transmissions, comprising a pressure line, a by-pass valve means communicating with said pressure line, a discharge line communicating with said valve means, said valve means being actuable by pressure fluid from said pressure line to by-pass fluid from said pressure line to said discharge line so as to reduce the pressure to a pre-determined value in said pressure line, and means for actuating said valve means to block passage of fluid from said pressure line to said discharge line during the course of a pre-determined interval of time, whereby fluid pressure is transmitted at a selectively increasing degree from a minimum to a maximum value, said valve means comprising a valve piston and a control piston, including a spring element intermediate said pistons, a respective chamber for each piston and in which said pistons are movable, said pressure line communicating with the chamber of said valve piston at all times, said discharge line communicating with said valve piston chamber and disposed to be cut off from said chamber by movement of said valve piston, means communicating pressure oil from said pressure line to the chamber of said control piston through a restricting flow throttle, means whereby said control piston can overpower said valve piston to shut off flow fluid from the valve, a piston chamber through said discharge line within a pre-determined time effected by flow through said throttle, wherein said means communicating from said pressure line to the chamber of said control piston comprises a tube passing concentrically through said pistons, at least one of said pistons being slidable on said tube.

5. A delay action by-pass valve system for hydraulic transmissions, whereby fluid pressure is transmitted to a transmission at a selectively increasing degree from a minimum to a maximum value, comprising a pressure line, a by-pass valve means communicating with said pressure line, a discharge line communicating with said valve means, said valve means being actuable by pressure fluid from said pressure line to by-pass fluid from said pressure line to said discharge line so as to reduce the pressure to a pre-determined value in said pressure line, said valve means comprising a valve piston directly exposed to pressure in said pressure line, a control piston, a thrust element intermediate said pistons, means whereby force exerted on said control piston may be transmitted through said thrust element to said valve piston to overcome the pressure thereon so as to block flow of pressure fluid from said pressure line to said discharge line, and means for communicating said control piston chamber with said pressure line for effecting movement of said control piston, said means including a restricted flow orifice to delay motion of said control piston thru a pre-determined degree of time, said restricting flow orifice comprising elements of differing heat coefficients, to reduce or enlarge the flow rate through said orifice in accordance with the temperature of the pressure fluid in said pressure line so as to maintain a substantially uniform rate of flow thru said orifice.

6. A delay action by-pass valve system for a hydraulic transmission, comprising a pressure line, a by-pass valve means communicating with said pressure line, a discharge line communicating with said valve means, said valve means being actuable by pressure fluid from said pressure line to by-pass fluid from said pressure line to said discharge line so as to initially reduce the pressure to a pre-determined value in said pressure line, and means for actuating said valve means to block passage of fluid from said pressure line to said discharge line during the course of a pre-determined interval of time, whereby fluid pressure is transmitted at a selectively increasing degree from a minimum to a maximum value, said valve means comprising a valve piston and a control piston and a spring intermediate said pistons whereby force exerted on said control pistons may be transmitted through said spring to move said valve piston, a chamber for each of said pistons, said pressure line being connected to said valve piston chamber and said discharge line being connected to said valve piston chamber whereby movement of said valve piston may serve to block flow of pressure fluid from said pressure line to said discharge line; means for communicating said control piston chamber with said pressure line for effecting movement of said control piston, said means including a restricted flow orifice to delay motion of said control piston for a predetermined degree of time, said restricting flow orifice comprising elements of differing heat coefficients to reduce or enlarge the flow rate through said orifice in accordance with the temperature of the pressure fluid in said pressure line so as to maintain a substantially uniform rate of flow thru said orifice.

7. A delay action by-pass valve system for hydraulic transmission, comprising a pressure line, a by-pass valve means communicating with said pressure line, a discharge line communicating with said valve means, said valve means being actuable by pressure fluid from said pressure line to by-pass fluid from said pressure line to said discharge line so as to reduce the pressure to a pre-determined value in said pressure line, and means for actuating said valve means to block passage of fluid from said pressure line to said discharge line during the course of a pre-determined interval of time, whereby fluid pressure is transmitted at a selectively increasing degree from a minimum to a maximum value, said valve means comprising a valve piston and a control piston and a thrust element intermediate said pistons whereby pressure exerted on said control piston may be transmitted through said thrust element to move said valve piston, a chamber for each of said pistons, said pressure line being connected to said valve piston chamber and said discharge line being connected to said valve piston chamber whereby movement of said valve piston may serve to block flow of pressure fluid from said pressure line to said discharge line, and means for communicating said control piston chamber with said pressure line for effecting movement of said control piston, said means including a restricted flow orifice so as to delay motion of said control piston for a pre-determined degree of time, said means for communicating said control piston chamber with said pressure line comprising a fluid passage means concentric with said valve piston and said control piston wherein said fluid passage means comprises a tube passing co-axially through said pistons, at least one of said pistons being slidable on said tube.

8. A delay action by-pass valve system for hydraulic transmission, comprising a pressure line, a by-pass valve means communicating with said pressure line, a discharge line communicating with said valve means, said valve means being actuatable by pressure fluid from said pressure line to by-pass fluid from said pressure line to said discharge line so as to reduce the pressure to a pre-determined value in said pressure line, and means for actuating said valve means to block passage of fluid from said pressure line to said discharge line during the course of a pre-determined interval of time, whereby fluid pressure is transmitted at a selectively increasing degree from a minimum to a maximum value, said valve means comprising a valve piston and a control piston and a thrust element intermediate said pistons whereby pressure exerted on said control piston may be transmitted through said thrust element to move said valve piston, a chamber for each of said pistons, said pressure line being connected to said valve piston chamber and said discharge line being connected to said valve piston chamber whereby movement of said valve piston may serve to block flow of pressure fluid from said pressure line to said discharge line, and means for communicating said control piston chamber with said pressure line for effecting movement of said control piston, said means including a restricted flow orifice so as to delay motion of said control piston for a pre-determined degree of time, said means for communicating said control piston chamber with said pressure line comprising a fluid passage means concentric with said valve piston and said control piston wherein said fluid passage means comprises a tube passing co-axially through said pistons, said tube having an orifice element and an elongated member within said tube comprised of a material having a higher coefficient of heat expansion than the material of said orifice element and having a head disposed adjacent said orifice element, whereby contraction and expansion of said elongated element responsive to temperature of fluid contiguous thereto effects variable spacing for fluid flow between said head and said orifice element.

9. In a device as set forth in claim 7, both of said pistons being slidably disposed on said coaxial tube.

10. In a device as set forth in claim 8, said elongated member being secured to and carried by said tube adjacent one end thereof.

References Cited in the file of this patent

UNITED STATES PATENTS

| | | |
|---|---|---|
| 514,394 | Henderson | Feb. 6, 1894 |
| 618,903 | Prince | Feb. 7, 1899 |
| 2,002,451 | Gray | May 21, 1935 |
| 2,064,343 | Finley | Dec. 15, 1936 |
| 2,109,958 | Finley | Mar. 1, 1938 |
| 2,283,311 | Bevins | May 19, 1942 |
| 2,610,300 | Walton | Sept. 9, 1952 |
| 2,649,688 | Slomer | Aug. 25, 1953 |
| 2,720,294 | Hindmarch | Oct. 11, 1955 |
| 2,721,640 | DeFeo | Oct. 25, 1955 |

UNITED STATES PATENT OFFICE
CERTIFICATION OF CORRECTION

Patent No. 2,935,999                                                      May 10, 1960

Josef Hock et al.

It is hereby certified that error appears in the above numbered patent requiring correction and that the said Letters Patent should read as corrected below.

Column 1, lines 17 and 20, for "hydramatic", each occurrence, read -- Hydra-Matic --.

Signed and sealed this 2nd day of May 1961.

(SEAL)
Attest:

ERNEST W. SWIDER                                            DAVID L. LADD
Attesting Officer                                               Commissioner of Patents